United States Patent [19]
Guo

[11] Patent Number: 5,919,874
[45] Date of Patent: Jul. 6, 1999

[54] PROCESS FOR MAKING HYDROXY-FUNCTIONAL ACRYLIC RESINS HAVING LOW RESIDUAL ALLYL MONOMER CONTENT

[75] Inventor: Shao-Hua Guo, West Goshen, Pa.

[73] Assignee: Arco Chemical Technology, L.P., Greenville, Del.

[21] Appl. No.: 08/901,313

[22] Filed: Jul. 28, 1997

[51] Int. Cl.$^6$ .............................. C08F 2/00; C08F 18/00
[52] U.S. Cl. ................................ 526/87; 526/320
[58] Field of Search ....................... 526/320, 87

[56] References Cited

U.S. PATENT DOCUMENTS

| | | | |
|---|---|---|---|
| 3,268,561 | 8/1966 | Peppel et al. | 260/348 |
| 4,618,703 | 10/1986 | Thanawalla et al. | 560/209 |
| 5,475,073 | 12/1995 | Guo | 526/307.5 |
| 5,480,943 | 1/1996 | Guo | 525/330.5 |
| 5,525,693 | 6/1996 | Guo | 526/329.2 |
| 5,534,598 | 7/1996 | Guo | 525/329.2 |
| 5,571,884 | 11/1996 | Guo | 526/329.6 |
| 5,605,995 | 2/1997 | Guo | 526/307.4 |
| 5,677,407 | 10/1997 | Sojka | 526/323.2 |

FOREIGN PATENT DOCUMENTS

| | | | |
|---|---|---|---|
| 0538033 | 4/1993 | European Pat. Off. | 526/320 |
| 2822436 | 12/1979 | Germany | 526/320 |

OTHER PUBLICATIONS

D. Swern et al., *J. Am. Chem. Soc.* 71 (1949) 1152.

*Primary Examiner*—Bernard Lipman
*Assistant Examiner*—N. Sarofim
*Attorney, Agent, or Firm*—Jonathan L. Schuchardt

[57] ABSTRACT

A process for making hydroxy-functional resins based on acrylate, hydroxyalkylacrylate, and allyl monomers is disclosed. The key to the process is to add the hydroxyalkylacrylate monomer in an amount and manner effective to produce a resin that contains, without vacuum stripping, less than about 1 wt. % of residual unreacted allyl monomers. Eliminating the need to vacuum strip the allyl monomer reduces process costs and enables the synthesis of new resins. The hydroxy-functional resins are readily crosslinked with melamines, polyisocyanates, or epoxies to give thermoset polymers.

16 Claims, No Drawings

5,919,874

1

PROCESS FOR MAKING HYDROXY-FUNCTIONAL ACRYLIC RESINS HAVING LOW RESIDUAL ALLYL MONOMER CONTENT

FIELD OF THE INVENTION

The invention relates to hydroxy-functional acrylic resins. In particular, the invention relates to a process for making relatively low molecular weight resins from acrylate and allyl monomers. The resins are useful in many thermoset polymer applications, especially polyurethane, melamine, and alkyd coatings.

BACKGROUND OF THE INVENTION

Hydroxy-functional acrylic resins of relatively low molecular weight ($M_n$=about 1000 to 5000) are valuable reactive intermediates for making high-performance coatings and other thermoset polymers. The resins are crosslinked with melamines, polyisocyanates, epoxies, and other crosslinkers to give useful thermosets.

We recently described new hydroxy-functional acrylic resins (see U.S. Pat. Nos. 5,475,073, 5,525,693, and 5,571,884) that incorporate recurring units from allylic alcohols or alkoxylated allylic alcohols and ordinary acrylate monomers. The resins are useful for many common thermoset polymers (see U.S. Pat. Nos. 5,534,598 and 5,480,943). Unlike acrylic resins previously known, preparation of these resins does not require a reaction solvent or chain-transfer agent to control reactivity and molecular weight. The resins are less costly because allyl alcohol and ordinary acrylate monomers are used instead of hydroxyalkylacrylates. In addition, the resins have exceptionally low viscosities, which makes them valuable for high-solids, low-VOC formulations.

Despite the cost and formulating advantages of hydroxy-functional acrylic resins derived from allyl alcohol and other allylic monomers, the resins have some drawbacks. First, the advantage of using an allyl monomer, which helps to regulate molecular weight and reactivity, is offset somewhat by the difficulty in getting all of the allyl monomer to react completely within a reasonable time period. Usually, an excess of the allyl monomer is kept in the reaction mixture throughout the polymerization, and excess unreacted allyl monomer is removed by vacuum stripping and/or stripping with water, steam, or inert gas. The examples of U.S. Pat. No. 5,475,073 illustrate the need for vacuum stripping to remove unreacted allyl monomers. Unfortunately, vacuum stripping adds to cycle time and multiplies utility costs. Modification of commercial reactors to accommodate vacuum stripping is often costly and impractical. In addition, the stripped allyl monomer must be recycled and reused to make the process affordable.

The need to vacuum strip allyl monomers also limits the kinds of allyl monomers that can be used and the types of resins available. For example, U.S. Pat. No. 5,475,073 teaches that propoxylated allyl alcohols having an average of only 1 or 2 oxypropylene units can be used because higher alkoxylated allylic alcohols cannot be easily stripped from the polymer. Preferably, alkoxylated allyl alcohols having more than 2 oxyalkylene units could be included because a wider variety of hydroxy-functional acrylic resins could be made.

Another key drawback relates to resins made by the earlier process that derive from allyl monomers containing mostly secondary hydroxyl groups, e.g., propoxylated allyl alcohol-based resins. These resins can be slow in curing, especially in applications (such as automotive refinishing) for which room-temperature curing is preferred.

In sum, an improved process for making hydroxy-functional acrylic resins is needed. Preferably, the process would retain the benefits of the earlier allyl monomer-based acrylic resin process (U.S. Pat. No. 5,571,884): low raw material cost, polymerization without solvents or chain-transfer agents, low-viscosity products. In addition, however, a valuable process would give resins that cure rapidly even at room temperature. Ideally, the process would eliminate the need to vacuum strip and recycle allyl monomers, and would permit the use of higher alkoxylated allylic alcohols.

SUMMARY OF THE INVENTION

The invention is a process for making a hydroxy-functional acrylic resin. The process comprises copolymerizing, in the presence of a free-radical initiator, an acrylate monomer, an allyl monomer, and a hydroxyalkylacrylate monomer. The acrylate monomer is a $C_1$–$C_{20}$ alkyl or aryl acrylate or methacrylate. The allyl monomer is selected from allylic alcohols, alkoxylated allylic alcohols, allyl esters, allyl carbonates, and allyl ethers. An ethylenic monomer is optionally included. The reaction product is a hydroxy-functional acrylic resin that has a hydroxyl number within the range of about 20 to about 500 mg KOH/g. A key to the process is to add a hydroxyalkylacrylate or methacrylate monomer in an amount and manner effective to produce a resin that contains, without vacuum stripping, less than about 1 wt. %, based on the amount of resin, of residual unreacted allyl monomers.

I surprisingly found that, in a process for making hydroxy-functional acrylic resins from allyl monomers and ordinary acrylates, the need for vacuum stripping and recycle of allyl monomers can be overcome by performing the polymerization in the presence of a hydroxyalkyl(meth)acrylate monomer. The hydroxyalkyl(meth)acrylate monomer unexpectedly enables continued polymerization of the allyl monomers to very low concentrations, effectively eliminating the need for vacuum stripping. Because vacuum stripping is not needed, alkoxylated allylic alcohols having more than 2 oxyalkylene units can easily be incorporated into the resins. An added benefit of the process is the production of resins having primary hydroxyl group functionality and correspondingly improved room-temperature curing properties. Moreover, the process of the invention offers these advantages, yet still retains the benefits of our recent technology for making hydroxy-functional acrylic resins—low cost, absence of solvents and chain-transfer agents, and low-viscosity products.

DETAILED DESCRIPTION OF THE INVENTION

The process of the invention comprises copolymerizing an acrylate monomer, an allyl monomer, and a hydroxyalkylacrylate monomer to produce a hydroxy-functional acrylic resin.

Acrylate monomers suitable for use in the process of the invention are ordinary $C_1$–$C_{20}$ alkyl or aryl acrylates or methacrylates (hereinafter collectively called "(meth) acrylates.") Not included are hydroxy-functional acrylate monomers. Preferred monomers are $C_1$–$C_{10}$ alkyl or aryl (meth)acrylates. Examples include methyl acrylate, methyl methacrylate, ethyl acrylate, butyl acrylate, butyl methacrylate, and the like, and mixtures thereof. It is often advantageous to use mixtures of various acrylates and methacrylates to control the resin glass-transition temperature.

An allyl monomer is included in the process of the invention. Suitable allyl monomers include allylic alcohols, alkoxylated allylic alcohols, allyl esters, allyl carbonates, and allyl ethers. Allylic alcohols useful in the process of the invention preferably have the general structure: $CH_2=CR-CH_2-OH$ in which R is selected from the group consisting of hydrogen and $C_1-C_5$ alkyl. Suitable allylic alcohols include, for example, allyl alcohol, methallyl alcohol, 2-ethyl-2-propen-1-ol, and the like, and mixtures thereof. Allyl alcohol and methallyl alcohol are preferred.

Alkoxylated allylic alcohols are also suitable monomers for use in the process. Preferred alkoxylated allylic alcohols have the general structure $CH_2=CR-CH_2-(A)_n-OH$ in which A is an oxyalkylene group, R is selected from the group consisting of hydrogen and $C_1-C_5$ alkyl, and n, which is the average number of oxyalkylene groups in the alkoxylated allylic alcohol, has a value from 1 to 50. Preferred oxyalkylene groups are oxyethylene, oxypropylene, oxybutylenes, and mixtures thereof. Most preferred are ethoxylated and propoxylated allylic alcohols having an average of 1 to 10 oxyalkylene groups.

Suitable alkoxylated allylic alcohols can be prepared by reacting an allylic alcohol with up to about 50 equivalents of one or more alkylene oxides in the presence of a basic catalyst as described, for example, in U.S. Pat. Nos. 3,268,561 and 4,618,703, the teachings of which are incorporated herein by reference. As will be apparent to those skilled in the art, suitable alkoxylated allylic alcohols can also be made by acid catalysis, as described, for example, in *J. Am. Chem. Soc.* 71 (1949) 1152.

Allyl esters can also be used in the process of the invention. Preferred allyl esters have the general structure: $CH_2=CR-CH_2-O-CO-R'$ in which R is selected from the group consisting of hydrogen and $C_1-C_5$ alkyl, and R' is hydrogen or a saturated or unsaturated linear, branched, or cyclic $C_1-C_{30}$ alkyl, aryl, or aralkyl group. Suitable allyl esters include, for example, allyl formate, allyl acetate, allyl butyrate, allyl benzoate, methallyl acetate, allyl fatty esters, and the like, and mixtures thereof. Particularly preferred are allyl esters derived from allyl alcohol and methallyl alcohol. Most preferred are $C_1-C_5$ alkyl esters of allyl alcohol and methallyl alcohol.

Preferred allyl carbonates have the general structure: $CH_2=CR-CH_2-O-CO_2R'$, wherein R is selected from the group consisting of hydrogen and $C_1-C_5$ alkyl, and R' is a saturated linear, branched, or cyclic $C_1-C_{30}$ alkyl, aryl, or aralkyl group. Suitable allyl carbonates include, for example, methyl allyl carbonate, ethyl methallyl carbonate, and the like, and mixtures thereof. Minor amounts of bis(allyl) carbonates such as bis(allyl) carbonate can also be included.

Preferred allyl ethers have the general structure: $CH_2=CR-CH_2-O-R'$ in which R is selected from the group consisting of hydrogen and $C_1-C_5$ alkyl, and R' is a saturated linear, branched, or cyclic $C_1-C_{30}$ alkyl, aryl, or aralkyl group. Suitable allyl ethers include, for example, allyl methyl ether, allyl ethyl ether, allyl tert-butyl ether, allyl methylbenzyl ether, and the like, and mixtures thereof.

The relative amount of $C_1-C_{20}$ alkyl or aryl (meth) acrylate and allyl monomers used in the process of the invention depends on many factors, including the desired degree of hydrophilicity and hydroxyl content of the resin, the nature of the monomers used, suitability for a particular end-use application, and other factors. Preferably, hydroxy-functional acrylic resins made by the process of the invention contain (based on the amount of resin) from about 40 to about 90 wt. % of recurring units derived from the $C_1-C_{20}$ alkyl or aryl (meth)acrylate monomer, and from about 5 to about 60 wt. % of recurring units derived from the allyl monomer. More preferably, the resins contain from about 50 to about 80 wt. % of recurring units derived from the $C_1-C_{20}$ alkyl or aryl (meth)acrylate monomer, and from about 10 to about 50 wt. % of recurring units derived from the allyl monomer.

A hydroxyalkylacrylate or methacrylate monomer is used in the process of the invention. Preferred hydroxyalkyl (meth)acrylates have the general structure: $H-(A)_n-O-(C=O)-CR=CH_2$ wherein A is an oxyalkylene group (preferably oxyethylene or oxypropylene), n has a value from 1 to 5 (preferably 1), and R is hydrogen or a $C_1-C_5$ alkyl group. Particularly preferred hydroxyalkyl(meth) acrylates are hydroxyethylacrylate, hydroxyethylmethacrylate, hydroxypropylacrylate, hydroxypropylmethacrylate, and the like, and mixtures thereof.

The amount of hydroxyalkyl(meth)acrylate used in the process depends on many factors, including the target hydroxyl number of the resin, the desired primary hydroxyl group content of the resin, the nature of the monomers used, the desired hydrophilicity of the resin, and other factors. Preferably, the amount of hydroxyalkyl(meth)acrylate used is at least about 5 wt. % based on the total amount of hydroxy-functional monomers used. (The total amount is the sum of allylic alcohol, alkoxylated allylic alcohol, and hydroxyalkyl(meth)acrylate monomers used.) Thus, the hydroxyalkyl(meth)acrylate can be the only hydroxy-functional monomer present (if, for example, a non-hydroxy-functional monomer such as an allyl ester or allyl ether is used as the only allyl monomer). Resins made by the process of the invention preferably contain up to about 60 wt. %, based on the amount of resin, of hydroxy-functional monomers.

Optionally, one or more ethylenic monomers is included in the copolymerization process of the invention. The ethylenic monomer is often included to control resin solubility, enhance physical properties, or reduce cost. When present, the ethylenic monomer is preferably used in an amount within the range of about 0.1 to about 50 wt. %. A more preferred range is from about 1 to about 25 wt. %. Preferred ethylenic monomers include, for example, vinyl aromatic monomers, unsaturated nitrites, vinyl esters, vinyl ethers, vinyl halides, vinylidene halides, unsaturated anhydrides, unsaturated dicarboxylic acids, acrylic and methacrylic acids, acrylamide and methacrylamide, fluoroalkylacrylates and methacrylates, conjugated dienes, and the like, and mixtures thereof. When an optional ethylenic monomer is included in the process, it is preferred to add it in proportion to the $C_1-C_{20}$ alkyl or aryl (meth)acrylate monomer.

The process is performed in the presence of a free-radical initiator. Peroxide, hydroperoxide, and azo initiators well known to those skilled in the art are preferred. Preferred initiators have a decomposition temperature greater than about 100° C. Suitable peroxide initiators include, for example, t-butylperoxide, t-butyl hydroperoxide, di-t-butylperoxide, t-butyl perbenzoate, cumene hydroperoxide, dicumyl peroxide, and the like. The amount of free-radical initiator needed varies, but it is generally within the range of about 0.1 to about 10 wt. % based on the total amount of monomers used. Preferably, the amount of free-radical initiator used is within the range of about 1 to about 5 wt. %. Generally, it is preferred to add the free-radical initiator gradually during the course of the polymerization; it is also desirable to match the addition rate of the free-radical initiator to the addition rate of the $C_1$–$C_{20}$ alkyl or aryl (meth)acrylate monomer.

Resins made by the process of the invention have hydroxyl functionality. Preferably, the resins have average hydroxyl functionalities within the range of about 2 to about 30; a more preferred range is from about 3 to about 15. The resins preferably have hydroxyl numbers within the range of about 20 to about 500 mg KOH/g; a more preferred range is from about 50 to about 200 mg KOH/g.

Resins made by the process of the invention preferably have number average molecular weights within the range of about 500 to about 50,000; a more preferred range is from about 1000 to about 10,000; most preferred is the range from about 1000 to about 5000.

Glass-transition temperatures ($T_g$) of resins made by the process of the invention can vary over a broad range. Preferably, the resins have a $T_g$ within the range of about –50° C. to about 100° C. A more preferred range is from about –40° C. to about 60° C.

The process of the invention can be performed over a wide temperature range. Generally, the reaction temperature will be within the range of about 60° C. to about 300° C. A more preferred range is from about 90° C. to about 200° C.; most preferred is the range from about 100° C. to about 180° C.

The process of the invention is advantageously performed in the absence of any reaction solvent, but a solvent may be included if desired. Useful solvents are those that will not interfere with the free-radical polymerization reaction or otherwise react with the monomers. Suitable solvents include ethers, esters, ketones, aromatic and aliphatic hydrocarbons, alcohols, glycol ethers, glycol ether esters, and the like, and mixtures thereof.

Preferably, at least about 50% of the $C_1$–$C_{20}$ alkyl or aryl acrylates or methacrylate is added gradually to the reaction mixture during polymerization. Gradual addition of the acrylate helps to ensure an even distribution of hydroxyl groups in the polymer. The acrylate monomers are generally much more reactive than the allyl monomer, so an excess of the allyl monomer is preferably maintained in the reactor during most of the polymerization.

The hydroxyalkyl(meth)acrylate monomer is added in an amount and manner effective to produce a hydroxyfunctional acrylic resin that contains, without vacuum stripping, less than about 1 wt. % (based on the amount of resin) of residual unreacted allyl monomers. To achieve this result, at least some hydroxyalkyl(meth)acrylate monomer is added to the reaction mixture in the later stages of the polymerization. Preferably, enough hydroxyalkyl(meth) acrylate is added in finishing the polymerization to maintain a weight ratio in the reactor of hydroxyalkyl(meth)acrylate to unreacted allyl monomer within the range of about 2:1 to about 3:1. For example, if the reaction mixture at or near the end of the polymerization contains about 5 wt. % of unreacted allyl monomer, it is preferred to finish the polymerization with from about 10 to about 15 wt. % of hydroxyalkyl(meth)acrylate.

In one preferred approach, illustrated below in Example 1, all of the allyl monomer is charged initially. Portions of the ordinary acrylate monomer, ethylenic monomer, and freeradical initiator are charged initially to the reactor, while most of the rest is added gradually at a decreasing rate during polymerization. All of the hydroxyalkyl(meth) acrylate monomer is then combined with the remaining acrylate monomer, ethylenic monomer, and free-radical initiator, and this mixture is added at a relatively constant rate to finish the polymerization. [Note: For safety reasons, the free-radical initiator is preferably added separately in large-scale preparations.] In the absence of the hydroxyalkyl (meth)acrylate monomer, a substantial amount (usually 5–30 wt. %) of unreacted allyl monomer remains in the product (see, e.g., Comparative Example 4). I surprisingly found, however, that finishing the polymerization with hydroxyalkyl(meth)acrylate present unexpectedly enables continued polymerization of the allyl monomers to very low concentrations and effectively eliminates the need for vacuum stripping.

Example 6 illustrates another preferred approach. In this case, all of the allyl monomer is charged initially. A portion of the ordinary acrylate monomer, ethylenic monomer, and free-radical initiator are charged initially to the reactor as in Example 1, while the rest is added gradually at a decreasing rate during polymerization. The hydroxyalkyl(meth)acrylate monomer is coincidentally added at a relatively constant rate. Relative to the other monomers, the amount of the hydroxyalkyl(meth)acrylate monomer being fed to the reactor increases as a function of time and is greatest at the end of the polymerization.

The key is to use enough of the hydroxyalkyl(meth) acrylate monomer at the later stages of the polymerization to achieve essentially complete polymerization of the allyl monomer(s). Exactly how much hydroxyalkyl(meth) acrylate monomer is used and how it is introduced depends on many factors within the control of the skilled person. An important consideration is the amount of allyl monomer used. When a greater proportion of allyl monomer is used, the amount of hydroxyalkyl(meth)acrylate needed may be greater. Another factor to consider is the desired distribution of primary hydroxyl functionality in the resin. If an even distribution of primary hydroxyl groups is important, a hydroxyalkyl(meth)acrylate such as hydroxyethylacrylate may need to be introduced throughout the polymerization (as shown, e.g., in Example 6).

When the process of the invention is used, the amount of residual unreacted allyl monomer present at the end of the polymerization, without using any vacuum stripping, is less than about 1 wt. % based on the amount of resin. Preferably, the amount of allyl monomer remaining is less than about 0.5 wt. % based on the amount of resin. While a vacuum strip procedure can be used in combination with the process to further reduce the level of allyl or other monomers present, eliminating the need for such a vacuum strip is a distinct advantage of the process of the invention.

Elimination of vacuum stripping reduces cycle time and saves on utility costs. Further savings result from the process because there is no need to recycle and reuse the allyl monomer. Because the need to vacuum strip the polymer is obviated, the process of the invention broadens the selection of possible allyl monomers and enables the synthesis of new resins based on higher alkoxylated allylic alcohols. For example, propoxylated allyl alcohols having 3–50 oxyalkylene units that could not be made practically by earlier methods can be made with the process of the invention.

Another advantage of the process of the invention is the ability to make acrylic polymers with evenly distributed hydroxyl groups. In the absence of an allyl monomer, hydroxyalkyl(meth)acrylates tend to homopolymerize and give polymers with unevenly distributed hydroxyl groups. Crosslinkable polymers that contain an even distribution of OH groups are expected to give thermosets with improved physical and mechanical properties.

Resins made by the process of the invention can be fine-tuned to control the amount and distribution of primary and secondary hydroxyl end groups in the resin. For example, by varying the proportion of propoxylated allyl alcohol (secondary OH groups) and hydroxyethylacrylate (primary OH groups), one can make resins that have the desired level of reactivity for thermoset applications such as melamine or polyurethane coatings. A coating resin that cures sluggishly at room temperature because of a high content of secondary hydroxyl groups may be improved, for example, by increasing the proportion of hydroxyethylacrylate in the resin (see, e.g., Example 7 and Comparative Example 8).

Resins made by the process of the invention are useful in a variety of thermoset polymer applications. These applications normally react a hydroxy-functional resin with a crosslinker to make the thermoset polymer. Examples include polyesters, polyurethanes, melamines, alkyds, uralkyds, and epoxies. These thermoset technologies, which are generally well known in the art, are explained in more detail in U.S. Pat. Nos. 5,534,598 and 5,480,943, the teachings of which are incorporated herein by reference.

The following examples merely illustrate the invention. Those skilled in the art will recognize many variations that are within the spirit of the invention and scope of the claims.

EXAMPLE 1

Allyl alcohol monopropoxylate (138 g) is charged to a one-liter reaction kettle equipped with agitator, heating mantle, temperature controller, nitrogen purge device, condenser, and addition pump. In a separate vessel, styrene (35 g), methyl methacrylate (35 g), butyl methacrylate (241 g), butyl acrylate (49 g), and t-butylperbenzoate (20 g) are mixed, deoxygenated with nitrogen, and chilled to 5° C. A portion (50 g) of this mixture is charged to the reactor; the rest is charged to the addition pump. After purging three times with nitrogen, the reactor is sealed and the contents are heated to 145° C. The mixture in the addition pump is added gradually to the polymerization reactor at a decreasing rate as follows: first hour: 100 g; second hour: 80 g; third hour: 65 g; fourth hour: 50 g; fifth hour: 35 g. After the fifth hour, the addition pump is charged with a mixture of styrene (17.5 g), methyl methacrylate (17.5 g), butyl methacrylate (120.5 g), butyl acrylate (24.5 g), hydroxyethylacrylate (69 g), and t-butylperbenzoate (10 g). The mixture is added to the reactor at 145° C. at a constant rate over 2 h. Heating at 145° C. continues for another 0.5 h following completion of monomer addition. No vacuum stripping procedure is used. [Note: For safety reasons, the free-radical initiator is preferably added separately in large-scale preparations.]

The resulting polymer (676 g) has Mw=13,400; Mn=3860; glass-transition temperature=−15° C.; and hydroxyl number (solid resin) 121 mg KOH/g. Content of residual monomers (wt. %): allyl alcohol monopropoxylate: 0.32; hydroxyethylacrylate: 0.030; butyl acrylate: 0.030; butyl methacrylate: 0.26; styrene: 0.004; methyl methacrylate: 0.022.

EXAMPLE 2

The procedure of Example 1 is followed, with the following modifications: (1) the polymerization is performed at 135° C. instead of 145° C.; (2) after completing the addition of the mixture of hydroxyethylacrylate and other monomers, heating continues for 1 h instead of 0.5 h.

The resulting polymer (697 g) has Mw=10,900; Mn=4100; glass-transition temperature=−17° C.; and hydroxyl number (solid resin) 126 mg KOH/g. Content of residual monomers (wt. %): allyl alcohol monopropoxylate: 0.48; hydroxyethylacrylate: none detected; butyl acrylate: none detected; butyl methacrylate: 0.19; styrene: 0.030; methyl methacrylate: 0.024.

EXAMPLE 3

The procedure of Example 1 is followed using hydroxyethylmethacrylate (69 g) instead of hydroxyethylacrylate.

The resulting polymer (680 g) has Mw =13,400; Mn=3860; glass-transition temperature=−15° C.; and hydroxyl number (solid resin) 119 mg KOH/g.

COMPARATIVE EXAMPLE 4

Allyl alcohol monopropoxylate (138 g) is charged to a one-liter reaction kettle equipped with agitator, heating mantle, temperature controller, nitrogen purge device, condenser, and addition pump. In a separate vessel, styrene (35 g), methyl methacrylate (35 g), butyl methacrylate (254 g), butyl acrylate (49 g), and t-butylperbenzoate (30 g) are mixed, deoxygenated with nitrogen, and chilled to 5° C. A portion (45 g) of this mixture is charged to the reactor; the rest is charged to the addition pump. After purging three times with nitrogen, the reactor is sealed and the contents are heated to 145° C. The mixture in the addition pump is added gradually to the polymerization reactor at a decreasing rate as follows: first hour: 86 g; second hour: 75 g; third hour: 65 g; fourth hour: 48 g; fifth hour 37 g; sixth hour: 28 g; seventh hour: 19 g. Heating at 145° C. continues for another 1 h following completion of monomer addition.

The polymer product is vacuum stripped at up to 160° C., and about 45 g of unreacted allyl alcohol monopropoxylate is collected. The resulting polymer has Mw=10,520; Mn=3220; glass-transition temperature=−24° C.; and hydroxyl number (solid resin) 118 mg KOH/g.

EXAMPLE 5

Allyl alcohol monopropoxylate (138 g) is charged to a one-liter reaction kettle equipped as in Example 1. In a separate vessel, styrene (35 g), methyl methacrylate (35 g), butyl methacrylate (241 g), butyl acrylate (49 g), methacrylic acid (48 g), and t-butylperbenzoate (20 g) are mixed, deoxygenated with nitrogen, and chilled to 5° C. A portion (56 g) of this mixture is charged to the reactor; the rest is charged to the addition pump. After purging three times with nitrogen, the reactor is sealed and the contents are heated to 135° C. The mixture in the addition pump is added gradually to the polymerization reactor at a decreasing rate as follows: first hour: 113 g; second hour: 90 g; third hour: 73 g; fourth hour: 56 g; fifth hour 39 g. After the fifth hour, the addition pump is charged with a mixture of styrene (10.9 g), methyl methacrylate (10.9 g), butyl methacrylate (75.4 g), butyl acrylate (15.3 g), hydroxyethylacrylate (43.2 g), methacrylic acid (15 g), and t-butylperbenzoate (10 g). The mixture is added to the reactor at 135° C. at a constant rate over 2 h. Heating at 135° C. continues for another 1 h following completion of monomer addition. No vacuum stripping procedure is used.

The resulting polymer (740 g) has Mw=17,350; Mn=5530; glass-transition temperature=−15° C.; acid number (solid resin) 40 mg KOH/g; and hydroxyl number (solid resin) 151 mg KOH/g. Content of residual monomers (wt. %): allyl alcohol monopropoxylate: 0.28; hydroxyethylacrylate: none detected; butyl acrylate: none detected; butyl methacrylate: 0.26; styrene: 0.037; methyl methacrylate: 0.067.

EXAMPLE 6

Allyl alcohol monopropoxylate (285 g), methyl amyl ketone (500 g), and t-butylperoxide (80 g) are charged to a five-liter stainless-steel reactor equipped with agitator, oil heating jacket, temperature controller, nitrogen purge device, and two addition pumps. In a separate vessel, styrene (143 g), methyl methacrylate (143 g), butyl methacrylate (1064 g), and butyl acrylate (204 g) are mixed and deoxygenated with nitrogen. A portion (229 g) of this mixture is charged to the reactor; the rest is charged to the first addition pump. Hydroxyethylacrylate (285 g) is purged with nitrogen and charged to the second addition pump. After purging three times with nitrogen, the reactor is sealed and the contents are heated to 135° C. The mixture in the first addition pump is added gradually to the polymerization reactor at a decreasing rate as follows: first hour: 310 g; second hour: 280 g; third hour: 250 g; fourth hour: 200 g; fifth hour: 150 g; sixth hour: 135 g. Meanwhile, the hydroxyethylacrylate is added to the mixture from the second addition pump at a constant rate of 47.5 g per hour. Heating at 135° C. continues for another 0.5 h following completion of monomer addition. No vacuum stripping procedure is used.

The resulting polymer has Mw=9800; Mn=4080; glass-transition temperature=−10° C.; and hydroxyl number (solid resin) 138 mg KOH/g. Content of residual monomers (wt. %): allyl alcohol monopropoxylate: 0.10; hydroxyethylacrylate: 0.11; butyl acrylate: 0.05; butyl methacrylate: 0.06; styrene: 0.01; methyl methacrylate: 0.03.

EXAMPLE 7

The resin solution of Example 6 (15 g) is mixed with methyl amyl ketone (2 g), t-butyl acetate (2 g), LUXATE HT2090 HDI trimer (5.4 g, product of ARCO Chemical Company), and dibutyltin dilaurate (0.005 g of a 2% solution in methyl amyl ketone). The coating solution is drawn down on a test panel with a thickness of 3 mils to test dry time. A "Bi-Cycle" Drying Time Recorder is used. The coating requires 4 h to set to touch, 5.5 h to dry through, and 7 h to dry hard.

COMPARATIVE EXAMPLE 8

The procedure of Example 7 is followed, except that the resin solution is prepared according to Comparative Example 4. The coating requires greater than 24 h to set to touch.

The preceding examples are meant only as illustrations; the following claims define the scope of the invention.

I claim:

1. A process which comprises copolymerizing a $C_1$–$C_{20}$ alkyl or aryl(meth)acrylate monomer with one or more allyl monomers selected from the group consisting of allylic alcohols, alkoxylated allylic alcohols, allyl esters, allyl carbonates, and allyl ethers, optionally in the presence of an ethylenic monomer, and in the presence of a free-radical initiator and a hydroxyalkyl(meth)acrylate monomer, to produce a hydroxy-functional acrylic resin having a hydroxyl number within the range of about 20 to about 500 mg KOH/g;

wherein the hydroxyalkyl(meth)acrylate monomer is added in an amount and manner effective to produce a hydroxy-functional acrylic resin that contains, without vacuum stripping, less than about 1 wt. %, based on the amount of resin, of residual unreacted allyl monomers.

2. The process of claim 1 wherein the $C_1$–$C_{20}$ alkyl or aryl(meth)acrylate monomer is selected from the group consisting of $C_1$–$C_{10}$ alkyl(meth)acrylates.

3. The process of claim 1 wherein the allyl monomer is allyl alcohol.

4. The process of claim 1 wherein the allyl monomer is an alkoxylated allylic alcohol of the formula: $CH_2$=CR—$CH_2$—$(A)_n$—OH in which A is an oxyalkylene group, R is hydrogen or a $C_1$–$C_5$ alkyl group, and n, which is the average number of oxyalkylene groups, has a value within the range of about 1 to about 50.

5. The process of claim 1 wherein the ethylenic monomer is one or more monomers selected from the group consisting of vinyl aromatic monomers, unsaturated nitriles, vinyl esters, vinyl ethers, vinyl halides, vinylidene halides, unsaturated anhydrides, unsaturated dicarboxylic acids, acrylic and methacrylic acids, acrylamide and methacrylamide, fluoroalkylacrylates and methacrylates, and conjugated dienes.

6. The process of claim 1 wherein the hydroxyalkyl(meth)acrylate monomer is selected from the group consisting of hydroxyethylacrylate, hydroxyethylmethacrylate, hydroxypropylacrylate, hydroxypropylmethacrylate, and mixtures thereof.

7. The process of claim 1 wherein the hydroxy-functional acrylic resin has a hydroxyl number within the range of about 50 to about 200 mg KOH/g.

8. The process of claim 1 wherein at least about 50 wt. % of the $C_1$–$C_{20}$ alkyl or aryl(meth)acrylate monomer is added gradually to the reaction mixture during polymerization.

9. The process of claim 1 wherein the hydroxy-functional acrylic resin contains from about 40 to about 90 wt. % of recurring units derived from the $C_1$–$C_{20}$ alkyl or aryl(meth)acrylate monomer, from about 5 to about 60 wt. % of recurring units derived from the allyl monomer, both amounts based on the amount of hydroxy-functional acrylic resin, and at least about 5 wt. %, based on the total amount hydroxy-functional monomers used, of the hydroxyalkyl(meth)acrylate monomer.

10. The process of claim 1 wherein the hydroxy-functional acrylic resin has a number average molecular weight within the range of about 500 to about 50,000.

11. A process which comprises:
   (a) charging a reactor with an allyl monomer selected from the group consisting of allylic alcohols, alkoxylated allylic alcohols, allyl esters, allyl carbonates, and allyl ethers;
   (b) gradually adding to the reactor, at a decreasing rate, major portions of a free-radical initiator, a $C_1$–$C_{20}$ alkyl or aryl(meth)acrylate monomer, and optionally, an ethylenic monomer while heating the reactor contents at a temperature within the range of about 60° C. to about 300° C. to copolymerize the monomers; and
   (c) finishing the polymerization by adding to the reactor a hydroxyalkyl(meth)acrylate monomer and the remaining minor portions of free-radical initiator, $C_1$–$C_{20}$ alkyl or aryl(meth)acrylate monomer, and optional ethylenic monomer, wherein the hydroxyalkyl(meth)acrylate monomer is used in an amount and manner effective to produce a hydroxy-functional acrylic resin that contains, without vacuum stripping, less than about 1 wt. %, based on the amount of resin, of residual unreacted allyl monomers.

12. The process of claim 11 wherein the $C_1$–$C_{20}$ alkyl or aryl(meth)acrylate monomer is selected from the group consisting of $C_1$–$C_{10}$ alkyl(meth)acrylates.

13. The process of claim 11 wherein the allyl monomer is allyl alcohol or an alkoxylated allylic alcohol of the formula: $CH_2$=CR—$CH_2$—$(A)_n$—OH in which A is an oxyalkylene group, R is hydrogen or a $C_1$–$C_5$ alkyl group, and n, which is the average number of oxyalkylene groups, has a value within the range of about 1 to about 50.

14. The process of claim 11 wherein the ethylenic monomer is one or more monomers selected from the group consisting of vinyl aromatic monomers, unsaturated nitriles, vinyl esters, vinyl ethers, vinyl halides, vinylidene halides, unsaturated anhydrides, unsaturated dicarboxylic acids, acrylic and methacrylic acids, acrylamide and methacrylamide, fluoroalkylacrylates and methacrylates, and conjugated dienes.

15. The process of claim 11 wherein the hydroxy-functional acrylic resin has a hydroxyl number within the range of about 20 to about 500 mg KOH/g.

16. The process of claim 11 wherein the hydroxy-functional acrylic resin contains from about 40 to about 90 wt. % of recurring units derived from the $C_1$–$C_{20}$ alkyl or aryl(meth)acrylate monomer, from about 5 to about 60 wt. % of recurring units derived from the allyl monomer, both amounts based on the amount of hydroxy-functional acrylic resin, and at least about 5 wt. %, based on the total amount hydroxy-functional monomers used, of the hydroxyalkyl (meth)acrylate monomer.

* * * * *